United States Patent
Iwamoto et al.

(10) Patent No.: US 10,801,988 B2
(45) Date of Patent: Oct. 13, 2020

(54) GAS SENSOR

(71) Applicant: DENSO CORPORATION, Kariya, Aichi-pref. (JP)

(72) Inventors: Yota Iwamoto, Kariya (JP); Yasufumi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/352,977

(22) Filed: Nov. 16, 2016

(65) Prior Publication Data

US 2017/0138895 A1 May 18, 2017

(30) Foreign Application Priority Data

Nov. 17, 2015 (JP) .................................. 2015-225040

(51) Int. Cl.
*G01N 27/407* (2006.01)
*G01M 15/10* (2006.01)
*G01N 27/406* (2006.01)

(52) U.S. Cl.
CPC ...... *G01N 27/4077* (2013.01); *G01M 15/102* (2013.01); *G01N 27/4067* (2013.01); *G01N 27/4071* (2013.01)

(58) Field of Classification Search
CPC ............. G01N 27/4077; G01N 27/409; G01N 27/403; G01N 27/406; G01N 27/4067; G01N 27/407–4071; G01M 15/102; G01M 15/104
See application file for complete search history.

(56) References Cited

U.S. PATENT DOCUMENTS

| | | | | |
|---|---|---|---|---|
| 6,214,186 | B1 * | 4/2001 | Watanabe | G01N 27/4077 204/427 |
| 7,708,869 | B2 * | 5/2010 | Yamada | G01N 27/4071 204/428 |
| 2002/0100687 | A1 † | 8/2002 | Atsumi | |
| 2004/0129069 | A1 * | 7/2004 | Sakawa | G01N 27/4077 73/114.32 |
| 2007/0261960 | A1 | 11/2007 | Aoki | |
| 2010/0163411 | A1 † | 7/2010 | Su | |
| 2011/0209523 | A1 | 9/2011 | Otsubo et al. | |

FOREIGN PATENT DOCUMENTS

| JP | 2006-058144 | | 3/2006 |
|---|---|---|---|
| JP | 2007-263067 | | 10/2007 |
| JP | 2007-263067 A | † | 10/2007 |
| JP | 2009-080100 | | 4/2009 |
| JP | 2009-080100 A | † | 4/2009 |

* cited by examiner
† cited by third party

*Primary Examiner* — Maris R Kessel
(74) *Attorney, Agent, or Firm* — Nixon & Vanderhye P.C.

(57) ABSTRACT

A gas sensor includes a sensor element having a detection section at a distal end portion thereof, and an element cover that surrounds a periphery of the sensor element. The sensor element includes electrodes and formed on a surface of a solid electrolyte body, a heater, and a porous protective layer formed on an outside of the detection section. The element cover includes a cover member with gas flow holes on a side surface and a gas passage is formed between the cover member and the sensor element. A distance between the cover member and the side surface of the sensor element in a direction perpendicular to an axis of the sensor element is in a range of 0.2 mm to 0.8 mm in the entire region of the gas passage leading from the gas flow holes to the detecting section.

6 Claims, 4 Drawing Sheets

GAS SENSOR

CROSS-REFERENCE TO RELATED APPLICATION

This application is based on and claims the benefit of priority from earlier Japanese Patent Application No. 2015-225040 filed Nov. 17, 2015, the description of which is incorporated herein by reference.

TECHNICAL FIELD

The present disclosure relates to a gas sensor for measuring a specific gas concentration in a measured gas.

BACKGROUND

A gas sensor for measuring oxygen concentration or the like in an exhaust gas is disposed in an exhaust system of an internal combustion engine.

Generally, the gas sensor is attached to an exhaust pipe wall in a state where a sensor element, to which a pair of electrodes is formed on a surface of a solid electrolyte body having oxygen ion conductivity, is inserted into a housing, and is protected by an element cover which is fixed to a distal end side of the housing.

A gas sensor of which a sensor element is protected from water by covering an outer surface of a distal end portion of a laminated type sensor element with a porous protective layer of thickness 10 µm or more, and a gap between the porous protective layer and the element cover is set to a predetermined range so that activation time can be shortened is disclosed in Japanese Patent Application Laid-Open Publication No. 2009-80100.

The gap between the porous protective layer and the element cover is set that 35% or more of an entire circumference to be 1 to 4 mm, for example, so that both thermal transmission control by the element cover and retaining heat by radiant heat are achieved, and thereby a detecting section can be maintained at a desired temperature.

On the other hand, depending on an operating state of an internal combustion engine, particulate matter (i.e., PM) such as soot may be included in an exhaust gas.

In addition, at the time of starting up the engine, water may be condensed in the exhaust pipe.

Therefore, the element cover of the gas sensor is configured to have a double structure of an outer cover and an inner cover, for example, and by devising the size and arrangement of the gas flow holes of each cover, PM and condensed water in the exhaust gas are suppressed from entering into the element cover.

However, it is impossible to completely prevent these PM and condensed water from entering. In particular, PM may easily attach to and deposit on a relatively low temperature part, for example, on an inner circumferential surface of the inner cover in the element cover.

When there exists a portion where a part of a gap between the sensor element and the inner cover is small as disclosed in Publication No. 2009-80100, distribution of the exhaust gas is obstructed when the PM is deposited in the gap, and there is a possibility that sensor detection accuracy is reduced.

SUMMARY

An embodiment provides a gas sensor capable of preventing a flow of an exhaust gas from being obstructed due to particulate matter entering and being deposited between a sensor element and an element cover, thereby maintaining sensor detection accuracy.

In a gas sensor according to a first aspect, the gas sensor includes a sensor element which is inserted and held in a cylindrical housing, having a detection section at a distal end portion thereof for detecting a specific gas concentration in a measured gas, and an element cover which is disposed on a distal end side of the housing, which surrounds a periphery of the sensor element protruding from the housing.

The sensor element includes a solid electrolyte body having oxygen ion conductivity, electrodes formed on a surface of the solid electrolyte body which is formed in a cylindrical shape, the electrodes constituting the detecting section, a heater accommodated in a cylinder of the solid electrolyte body, and a porous protective layer formed on an outside of the detecting section.

The element cover includes a cover member provided with gas flow holes on a side surface of the cover member, and a gas passage is formed between an outer surface of the sensor element and an inner surface of the cover member.

A distance between the cover member and the side surface of the sensor element in a direction perpendicular to an axis of the sensor element is in a range of 0.2 mm to 0.8 mm in the entire region of the gas passage leading from the gas flow holes to the detecting section.

The measured gas flows into the cover member forming the element cover via the gas flow holes, passes through the porous protective layer at the distal end of the sensor element, and reaches to the electrodes of the detecting section.

At this time, the heater is accommodated in the tubular solid electrolyte body, so that the entire sensor element can be heated uniformly.

Further, since the distance D between the sensor element and the cover member in the direction perpendicular to the axis is set to a predetermined small gap in the entire gas passage leading from the gas flow holes to the detecting section, the heat from the sensor element can be efficiently received by the cover member wall.

Thereby, even when the particulate matter contained in the measured gas enter into the element cover, since the particulate matter adhered to the passage wall is burned and removed from the gas passage facing the detecting section of the sensor element, there is no buildup of particulate matter.

As described above, according to the above aspect, particulate matter is prevented from entering and depositing between a sensor element and an inner cover, and thereby high sensor detection accuracy can be maintained.

DETAILED DESCRIPTION OF THE PREFERRED EMBODIMENTS

First Embodiment

Hereinafter, embodiments of the disclosure will be described with reference to FIGS. 1 to 3.

Figure 1:
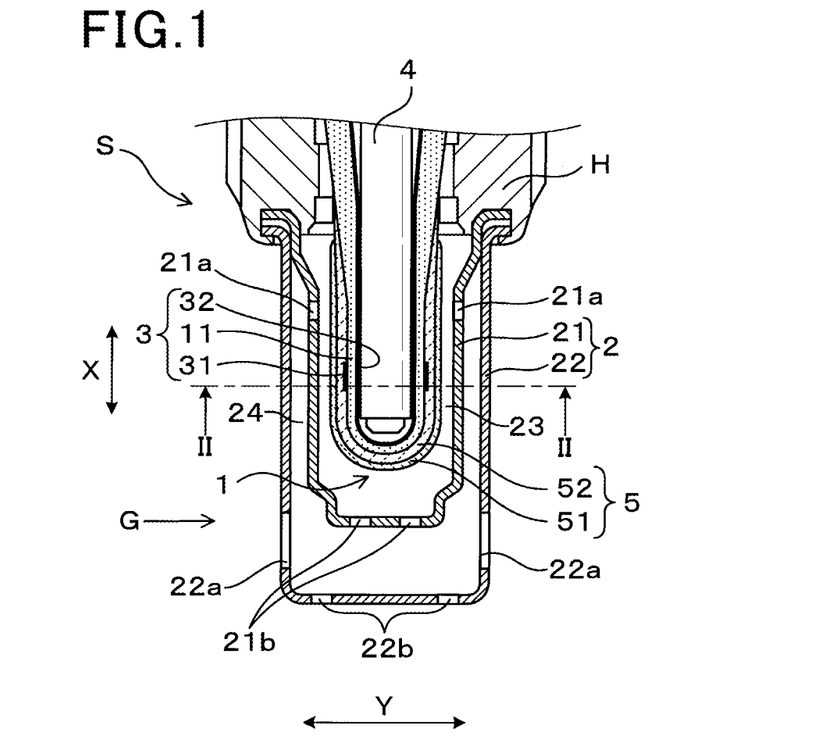
FIG. 1 shows a longitudinal sectional view of a main portion of a gas sensor according to a first embodiment.

As shown in FIG. 1, a gas sensor S of a first embodiment includes a sensor element 1 which is inserted and held in a cylindrical housing H, and an element cover 2 disposed on a distal end side of the housing H.

The sensor element 1 defines a vertical direction in the drawing as an axial direction X, and a direction perpendicular thereto as a direction Y perpendicular to an axis.

The sensor element 1 has a detecting section 3 for detecting a specific gas concentration in a measured gas at a distal end portion thereof (i.e., a lower end portion in the drawing), and a heater 4 therein.

The element cover 2 is disposed so as to surround and protect a periphery of the sensor element 1 protruding from the housing H.

The gas sensor S is installed in an exhaust pipe of an internal combustion engine, for example, and may be used as an exhaust gas sensor for detecting a specific gas concentration in the exhaust measured gas, such as an air-fuel ratio sensor or an oxygen sensor.

Figure 3:
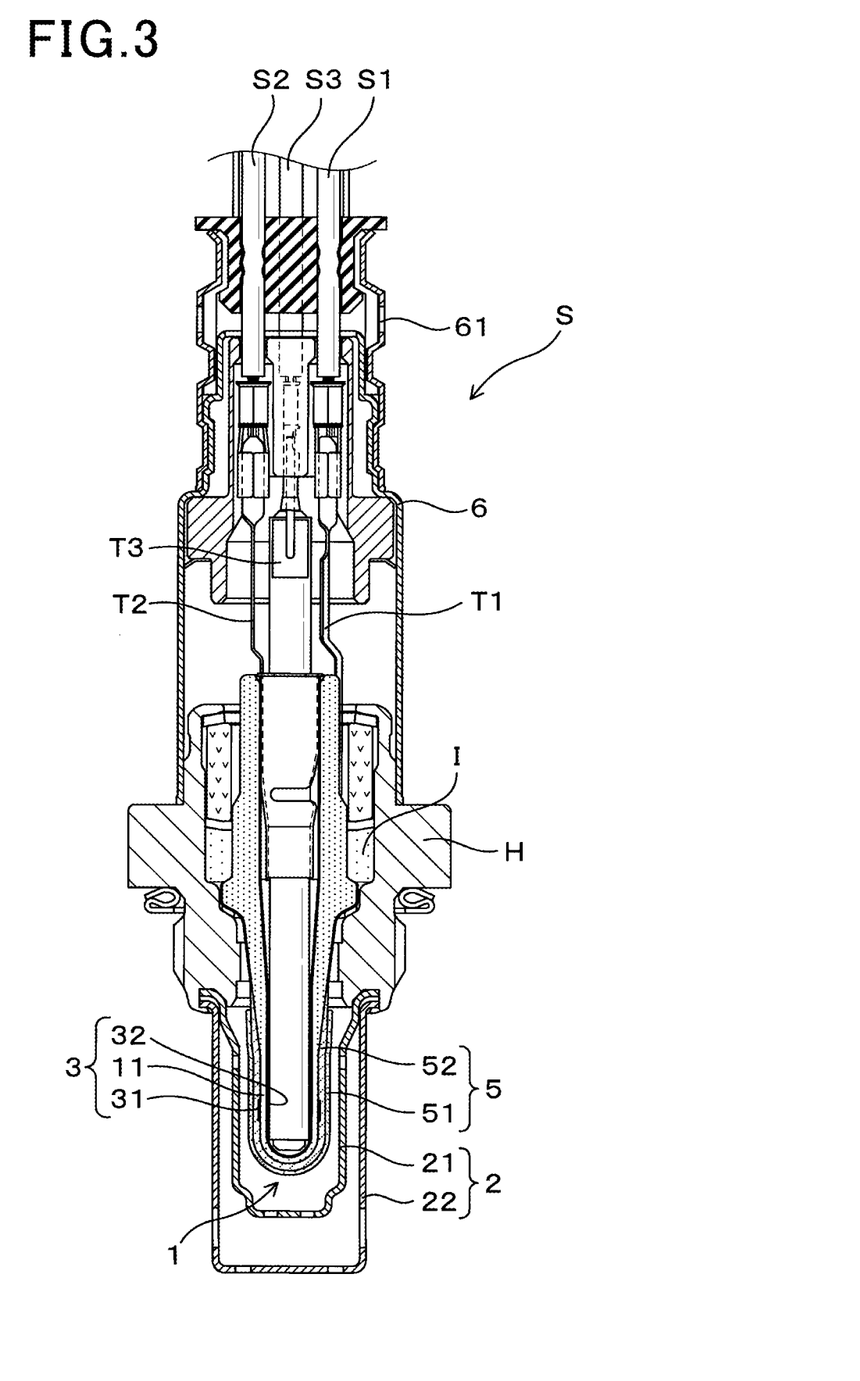
FIG. 3 shows a longitudinal sectional view of an entire structure of the gas sensor according to the first embodiment.

According to a configuration example of the air-fuel ratio sensor as shown in FIG. 3 as an example, the gas sensor S is attached to an exhaust pipe wall (not shown) by a screw portion provided at a distal end portion of an outer periphery of the housing H.

An intermediate portion with a large diameter of the sensor element 1 is supported by a stepped portion provided in a cylinder of the housing H.

Further, a cylindrical insulating material I is filled between a base end side (i.e., upper end side in the drawing) of an outer circumferential surface of the sensor element 1 and an inner peripheral surface of the housing H.

A base end portion (i.e., upper end portion in the drawing) of the sensor element 1 protrudes from the housing H, and is accommodated in an atmosphere-side cover 6.

The tubular atmosphere-side cover 6 is attached to the base end side of the housing H, and is adapted to incorporate air therein from inlet ports 61 that open at an outer peripheral side surface thereof.

The sensor element 1 includes a solid electrolyte body 11 formed in a bottomed cylindrical shape, the detecting section 3 having measuring electrodes 31 and a reference electrode 32 disposed at a distal end portion of the solid electrolyte body 11, and a porous protective layer 5 that covers the distal end portion of the solid electrolyte body 11.

The porous protective layer 5 covers a surface of the distal end portion of the sensor element 1 that is located within the element cover 2 and is exposed to the exhaust gas, thereby protects the sensor element 1 from the water.

In the present embodiment, the porous protective layer 5 has a two-layer structure of a trap layer 51 and a diffusion layer 52.

The porous protective layer 5 may be configured as a single layer or a multilayer structure of three or more layers.

The rod-shaped heater 4 is coaxially accommodated within a cylinder of the solid electrolyte body 11.

The heater 4 generates heat by energization, and heats the detecting section 3 to a temperature equal to or higher than an activation temperature (for example, 500° C.).

The solid electrolyte body 11 is a sintered ceramic body formed of partially stabilized zirconia or the like, for example, and has oxygen ion conductivity.

A base end portion of the solid electrolyte body 11 is opened to within the atmosphere-side cover 6, and atmosphere as a reference gas is introduced inside the solid electrolyte body 11.

A plurality of lead wires S1 to S3 connected to a control unit (not shown) are insulated and held at a base end opening portion of the atmosphere-side cover 6, and are electrically connected to a plurality of terminal portions T1 to T3 extending from the sensor element 1 in the atmosphere-side cover 6.

The lead wires S1, S2, and the terminal portions T1, T2 are respectively connected to the measuring electrodes 31 and the reference electrode 32 of the detecting section 3.

The lead wire S3 and the terminal portion T3 are connected to the heater 4.

Figure 2:
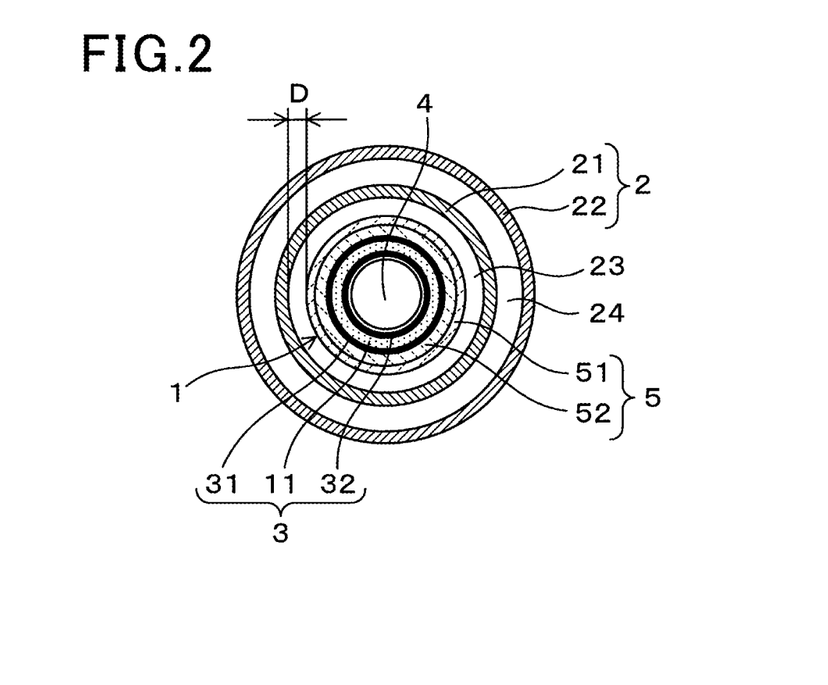
FIG. 2 shows a cross-sectional view of the main portion of the gas sensor, showing a sectional view taken along a line II-II of FIG. 1 according to the first embodiment.

In FIGS. 1 and 2, a distal end portion of a closed end side of the sensor element 1 protrudes into the element cover 2 and is positioned coaxially.

The measuring electrodes 31 with a predetermined width are formed on an outer surface of the solid electrolyte body 11 near the distal end of the sensor element 1.

The reference electrode 32 is formed on an inner peripheral surface of the solid electrolyte body 11 that faces the measuring electrodes 31 to sandwich the solid electrolyte body 11 therebetween.

The measuring electrode 31 of the detecting section 3 is exposed to the exhaust gas G introduced into the element cover 2, and the reference electrode 32 is exposed to the atmosphere introduced into the solid electrolyte body 11, thereby detecting the oxygen concentration from a potential difference generated between the electrodes.

The surface of the distal end portion of the sensor element 1 located inside the element cover 2 is covered with the diffusion layer 52, and the trap layer 51 is formed on the outside of the diffusion layer 52.

The trap layer 51 is a porous layer made of a ceramic material such as alumina with a good thermal shock resistance, and protects the sensor element 1 by capturing the condensed water in the exhaust gas G.

The porosity of the trap layer 51 is, for example, 50% to 90%, and a heat transfer effect described later becomes high when porosity is large and thermal capacity is small, and, easily diffuses the attached condensed water.

The diffusion layer 52 is made of a ceramic layer of spinel, etc., and while protecting the surface of the sensor element 1, the diffusion layer 52 transmits the exhaust gas G at a predetermined diffusion resistance.

Porosity or thickness of the diffusion layer 52 is adjusted to obtain desired diffusion resistance, and typically, porosity is therefore less than the trap layer 51.

In the present embodiment, the element cover 2 is a double-cover structure, and is formed of an inner cover 21 with a small diameter and an outer cover 22 with a larger diameter than the inner cover 21, both having a bottomed cylindrical shape.

A plurality of gas flow holes 21a are formed on a side surface of the base end side of the inner cover 21 as a cover member, and a plurality of gas flow holes 21b are formed on the distal end surface of the inner cover 21.

A plurality of gas flow holes 22a are formed on a side surface of the base end side of the outer cover 22 that is coaxially disposed on an outside of the inner cover 21, and a plurality of gas flow holes 22b are formed on the distal end surface of an outer periphery of the outer cover 22.

Here, although an axial length of the inner cover 21 is formed shorter than an axial length of the outer cover 22, and the relatively large gas flow holes 22a are formed on the side surface of the outer cover 22 facing a space formed between the distal end surfaces of the both covers, it not necessarily limited to the configuration shown in the drawings.

Further, the element cover 2 may also be a single-cover structure having no outer cover 22, or a triple or more cover structure having a plurality of cover members on the outside of the inner cover 21.

An inner gas passage 23 as a gas passage is formed between an inner surface of the inner cover 21 and an outer surface of the sensor element 1.

In addition, an outer gas passage 24 is formed between an outer surface of the inner cover 21 and an inner surface of the outer cover 22.

The inner cover 21 has a cylindrical shape of a constant diameter excluding a base end portion fixed to the housing together with the outer cover 22, and a distal end portion having the gas flow holes 21b.

Furthermore, an annular gas passage having a constant width is formed between the inner cover 21 and the outer surface of the sensor element 1 having a cylindrical shape of a constant diameter.

Similarly, another annular gas passage having a constant width is formed between the outer surface of the inner cover 21 and the inner surface of the outer cover 22 having the cylindrical shape of constant diameter.

The exhaust gas G is introduced from the gas flow holes 22a at the distal end side of the outer cover 22 into the outer gas passage 24, and flows to the opposing gas flow hole 22a.

Some of the exhaust gas G flows into the annular gas passage extending toward the gas flow holes 21a, and further, flows in from the gas flow holes 21a to the inside the gas passage 23, and flows towards the detecting section 3.

At this time, depending on a combustion state of the internal combustion engine, particulate matter from the fuel may be contained in the exhaust gas G, and when the particulate matter adheres to a low temperature portion of the element cover 2 and is deposited thereto, whereby the flow of the exhaust gas G is obstructed.

Particularly, since the inner gas passage 23 is positioned on the inner side of the element cover 2, it tends to be lower in temperature than the outer gas passage 24 of which the outer cover 22 is exposed to the exhaust gas G of high temperature in the exhaust pipe.

Further, at the time of starting up the engine, water may be condensed in the exhaust pipe and easily reaches the surface of the sensor element 1 together with the exhaust gas G, thus there is a possibility that cracks may occur when heating the heater.

Therefore, for the inner gas passage 23, the particulate matter adhering to the passage wall can be burned and removed by the heat of the heater 4 by reducing a distance between the facing surfaces of the annular gas passage.

Specifically, in the annular gas passage extending to the detecting section 3 from the gas flow holes 21a of the inner gas passages 23, a distance D in a direction perpendicular to an axis (hereinafter, simplified to a distance D) between the outer surface of the sensor element 1, i.e., the surface of the trap layer 51 serving as an outermost layer of the porous protective layer 5 and the inner surface of the inner cover 21 facing the outer surface of the sensor element 1, is configured to be in a range of 0.2 mm to 0.8 mm in the entire region.

A clearance necessary during assembly can be obtained by configuring the distance D to 0.2 mm or more.

Further, the inner surface of the inner cover 21 can easily receive heat by configuring the distance D to be 0.8 mm or less, thereby enabling the inner surface of the inner cover 21 to be heated above the combustion temperature of the particulate matter (e.g., 500° C.).

Preferably, the distance D may be in the range of 0.2 mm to 0.6 mm in the entire region.

Here, the annular gas passage extending from the gas flow holes 21a to the detecting section 3 is defined as a passage at least from a position of a distal end side edge portion of the gas flow hole 21a to a position of a base end side edge portion of the measuring electrode 31 of the detecting section 3.

By suppressing the particulate matter from depositing in the annular passageway within this range, the exhaust gas G can sufficiently reach the measuring electrode 31, thus the detection accuracy can be maintained.

Preferably, as shown in the drawings, the distance D between the entire surface of the measuring electrode 31 and the inner surface of the inner cover 21, and furthermore, in the annular passage around the detecting section 3 including a position in the distal end side of the measuring electrode 31 may be in the above-mentioned range.

For the outer gas passage 24, a distance between the opposing surfaces of the annular gas passage is configured sufficiently larger than that of the inner gas passage 23 so as not to interfere with the flow of the exhaust gas G.

Specifically, the exhaust gas G may sufficiently flow even if the particulate matter has adhered onto the passageway wall.

For example, a distance between the outer surface of the inner cover 21 and the inner surface of the outer cover 22 in the direction perpendicular to the axis is configured to be in a range of 1 mm or more for the entire region of the annular gas passage extending to the gas flow holes 21a of the inner gas passages 23.

Preferably, it is set appropriately in the range of 1 mm to 6 mm, for example, according to a shape or an outer diameter of the element cover 2.

More preferably, by adjusting the thickness of the trap layer 51 or the diffusion layer 52 serving as the porous protective layer 5, both the adjustment of the distance D between the outer surface of the sensor element 1 and the inside surface of the inner cover 21, and protection from the water can be achieved.

Specifically, since by making the porous protective layer 5 thicker, the gap between the facing inner surface of the inner cover 21 decreases, thus the distance D can be easily configured within the above range.

Preferably, the overall thickness of the porous protective layer 5 including the trap layer 51 and the diffusion layer 52, for example, is in a range of 500 μm to 1200 μm.

When the thickness is less than 500 μm, there is a concern that the effect of preventing the element from cracking and heat transfer due to the condensed water cannot be sufficiently obtained, and when the thickness exceeds 1200 μm, there is a concern that the gap between the inner cover 21 is reduced, thus assemblability is lowered.

At this time, the thickness of the diffusion layer 52 and the trap layer 51 is configured, for example, in the range of 250 μm to 600 μm, and the entire thickness of the porous protective layer 5 including them is suitably set to be within the above range of 250 µm to 600 µm.

For example, it is easy to set the distance D when the thickness of the trap layer 51 serving as the outermost layer of the porous protective layer 5 is adjusted.

When the thickness of the trap layer 51 is less than 250 µm, the effect of capturing the condensed water and the heat transfer cannot be sufficiently obtained, and as the thickness of the trap layer 51 becomes thicker, more condensed water can be captured so that it is possible to protect the detecting section 3.

At this time, since the porosity is large and the heat capacity is small in the trap layer 51, the heat from the heater 4 incorporated in the sensor element 1 is efficiently transferred to the inner surface of the opposing inner cover 21.

As described above, a configuration of accommodating the rod-shaped heater 4 in the cylindrical sensor element 1 is employed.

Then, the inner surface of the inner cover 21 is evenly heated by heat conduction from the sensor element 1 and can be maintained at a high temperature by setting the distance D between the inner cover 21 among the element cover 2 and the sensor element 1, or the thickness of the porous protective layer 5 formed on the surface of the sensor element 1 in the predetermined range.

Thus, even when the particulate matter enters the inner gas passage 23 in the inner cover 21 together with the exhaust gas G, the particulate matter being adhered can be burned and removed.

The particulate matter can be prevented from depositing in the outer gas passages 24 within the outer cover 22 by widening the annular gas passage.

As a result, the detection accuracy of the sensor element 1 can be maintained high without obstructing the flow of the exhaust gas G.

Further, the sensor element is protected from a large amount of condensed water generated at the time of starting by forming the trap layer made of the porous protective layer 5 thick, thus it is possible to enhance the effect of preventing the element from cracking.

The gas sensor S with the above structure can be used as an air-fuel ratio sensor or an oxygen sensor disposed in upstream or downstream of an exhaust gas purification catalyst mounted in an exhaust pipe in an exhaust purification system of an automobile engine which is an internal combustion engine.

In such a system, usually, since feedback control is performed based on an output of the air-fuel ratio sensor disposed at a downstream side, there is a risk that small amounts of particulate matter affect the output.

For this reason, an air-fuel ratio sensor that enables high detection accuracy and responsiveness is needed by reliably removing the particulate matter.

Even in such a case, by employing the gas sensor S of the present embodiment, it is possible to start the detection of the air-fuel ratio by promptly raising the temperature to the activation temperature when starting the engine, thus it is possible to improve the engine controllability.

First Test Example

Figure 4:
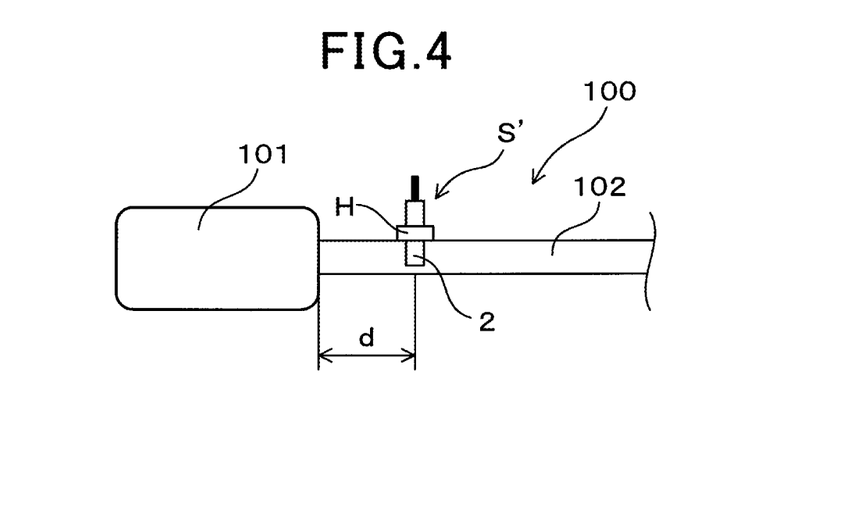
FIG. 4 shows a schematic view for explaining a testing method using a test apparatus according to a first test example.

By using a test apparatus 100 shown in FIG. 4, combustion effects of the particulate matter when changing the distance D between the inner cover 21 and the sensor element 1 was examined in the gas sensor S with the above configuration.

The test apparatus 100 includes a conduit 102 connected to a hot air device 101, and the apparatus 100 is configured such that a hot air of a predetermined temperature corresponding to an exhaust gas of an automobile engine can be delivered into the conduit 102 at a predetermined flow rate.

Here, the temperature of the hot air is set to 400° C., the flow rate is set to 5 L/min., and the distance D has been changed in a range of 0.2 mm to 1.3 mm.

The housing H of the gas sensor S is screwed in the conduit 102 wall, and the element cover 2 disposed on the distal end side of the housing H is protruded and positioned in the conduit 102.

Prior to the test, the particulate matter collected in advance was kept adhered to the inner surface of the inner cover 21 of the element cover 2 in the gas sensor S.

Then, after measuring the weight of the gas sensor S equipped with the element cover 2, the gas sensor S was attached to the test apparatus 100.

The attaching position of the gas sensor S was set to a position where a distance d from an upstream end of the conduit 102 is 0.3 m.

The hot air was sent from the hot air device 101 into the conduit 102 by operating the test apparatus 100d, and the gas sensor S was driven for 10 minutes by a control unit (not shown).

Then, the gas sensor S was removed from the conduit 102, the weight of the gas sensor S was measured again, and the combustion rate of the particulate matter adhered (i.e., PM combustion rate) was calculated from the weight difference between before and after the test.

Figure 5:
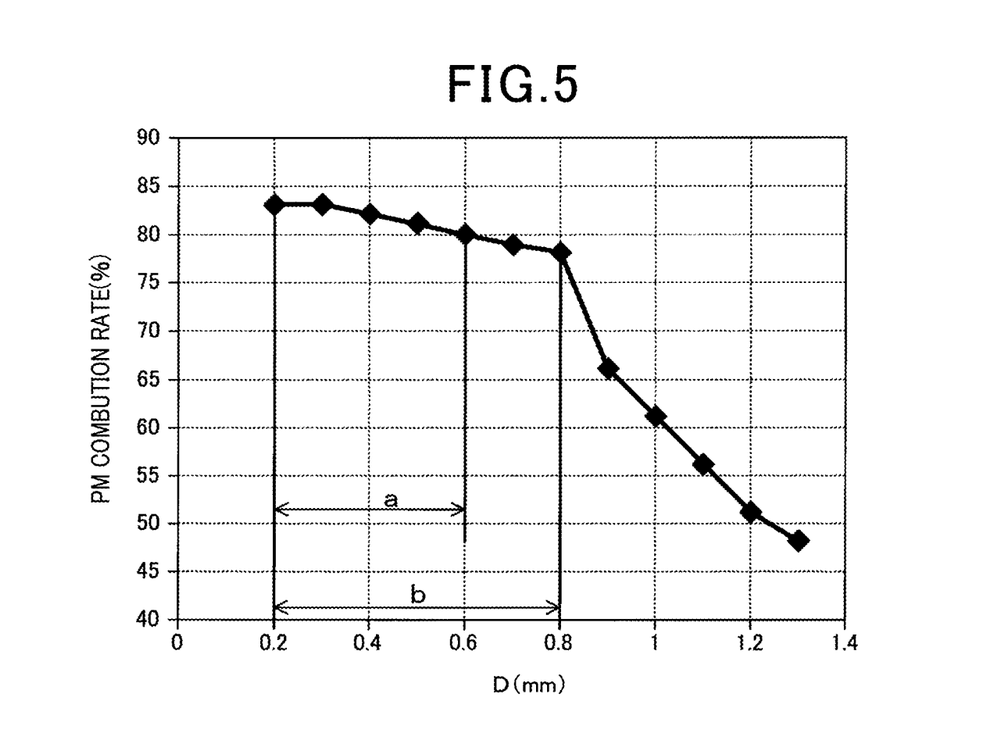
FIG. 5 shows a graph of a relationship between a distance D between a sensor element and an inner cover in a direction perpendicular to an axis, and a PM combustion rate according to the first test example.

The results are shown in FIG. 5.

As it is apparent from FIG. 5, as the distance D between the inner cover 21 and the sensor element 1 is small, the PM combustion rate is high, which is about 83% at 0.2 mm.

As the distance D becomes large, the PM combustion rate tends to gradually fall.

However, the PM combustion rate is approximately 80% when the distance D is at 0.6 mm, which in not a great reduction, and a PM combustion rate of greater than about 75% is maintained even when the distance D is at 0.8 mm.

Then, when the distance D exceeds 0.8 mm, the PM combustion rate falls greatly, when the distance D exceeds 1 mm the rate is about 60%, and when the distance D is at 1.3 mm, the rate falls to about 48%.

Thus, by arranging the inner cover 21 relative to the sensor element 1 so that the distance D becomes 0.2 mm to 0.8 mm (range b in FIG. 5), preferably, 0.2 mm to 0.6 mm (range a in FIG. 5), it can be seen that even when the particulate matter is adhered, it can be burned and removed.

Second Test Example

In the gas sensor S with the above configuration, another test in the same manner as in the first test example is performed by preparing two size types of the solid electrolyte body 11 of the sensor element 1 (i.e., element size: φ 4.5 mm and φ 3.9 mm), and changing the gas flow rate of the test apparatus 100 in a range of 1 to 10 L/min.

The distance D between the inner cover 21 and the sensor element 1 is set to three kinds, namely, 0.6 mm, 0.8 mm, and 1.0 mm.

The results are shown in Table 1.

The PM combustion rate was evaluated in three steps of A: 80% or more, B: 75% or more, and C: less than 75%.

Figure 6:
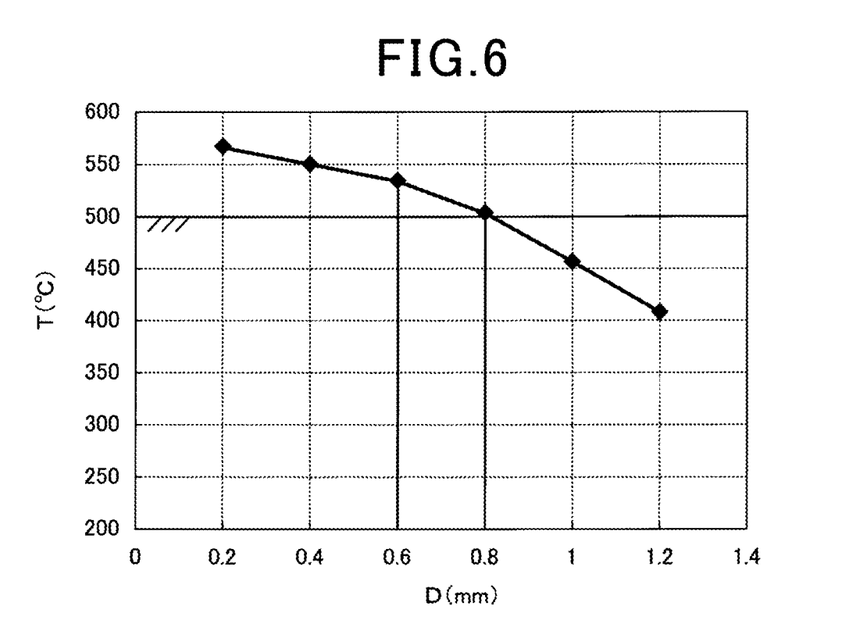
FIG. 6 shows a graph of a relationship between the distance D between the sensor element and the inner cover in the direction perpendicular to the axis, and the temperature T of the inner cover according to a second test example.

Further, the temperature of the inner surface of the inner cover 21 was measured, and a relationship between the temperature and the distance D is shown in FIG. 6.

TABLE 1

| Element Size ($\varphi$ ZrO$_2$) | Gas Flow Rate (L/min) | Element-Inner cover distance D (mm) | PM Combustion Rate |
|---|---|---|---|
| $\varphi$ 4.5 | 1 | 0.6 | A |
| | | 0.8 | B |
| | | 1 | C |
| | 5 | 0.6 | A |
| | | 0.8 | B |
| | | 1 | C |
| | 10 | 0.6 | A |
| | | 0.8 | A |
| | | 1 | C |
| $\varphi$ 3.9 | 1 | 0.6 | A |
| | | 0.8 | B |
| | | 1 | C |
| | 5 | 0.6 | A |
| | | 0.8 | B |
| | | 1 | C |
| | 10 | 0.6 | A |
| | | 0.8 | A |
| | | 1 | C |

A: 80% or more
B: 75% or more
C: less than 75%

As it is apparent from Table 1, the smaller the distance D, and the larger the gas flow rate, there is a tendency that the PM combustion rate increases.

When the distance D is 0.6 mm, regardless of the element size and the gas flow rate, 80% or more of the high PM combustion rate can be obtained.

When the distance D is 0.8 mm, 80% or more of the PM combustion rate can be obtained at the gas flow rate of 10 L/min, and the PM combustion rate is 75% or more otherwise.

In contrast, when the distance D is 1.0 mm, 75% or more of the PM combustion rate cannot be obtained even if the gas flow rate is increased.

Further, the temperature of the inner cover 21 is in a relationship with the distance D shown in FIG. 6, and as the distance D becomes smaller by a heat reception from the heater 4 integrated in the gas sensor S, the temperature rises.

In particular, in the region where the distance D is 0.8 mm or less, the temperature is 500° C. or more, that is, the temperature is more than necessary to combust the particulate matter, results are consistent with the results in Table 1 in which a high PM combustion rate is obtained.

Third Test Example

Next, in the gas sensor S of the above construction, presence or absence of cracks in the solid electrolyte body 11 of the sensor element 1 when the thickness of the porous protective layer 5 including the trap layer 51 and the diffusion layer 52 has been changed was investigated by performing a water test by the following method.

Prior to the water test, first, a distal end portion of the sensor element 1 being exposed was prepared by cutting the element cover 2 of the gas sensor S, and in this state, the gas sensor S was driven.

A drop of water of 30 μL volume was dropped on the detecting section 3 of the gas sensor S, and then the presence or absence of the cracks in the solid electrolyte body 11 was confirmed by a visual check.

The thicknesses of the porous protective layers 5 are configured to be 200 μm to 1300 μm, and a plurality of samples for each thickness were prepared.

The results are shown in Table 2.

Here, the number of the samples is set to 4, and the number of cracks found in the sample is showed in the table.

TABLE 2

| Thickness of Porous Protective Layer (Mm) | Presence or Absence of The Cracks in Solid Electrolyte Body after Water Test* |
|---|---|
| 200 | 4/4 |
| 300 | 3/4 |
| 500 | 0/4 |
| 700 | 0/4 |
| 800 | 0/4 |
| 1000 | 0/4 |
| 1200 | 0/4 |
| 1300 | — |

*number of cracks/number of samples

As it is apparent from Table 2, the thicker the porous protective layer 5, cracks hardly occur due to the water, and when the thickness of the porous protective layer 5 is 500 μm or more, no samples were cracked.

In contrast, when the thickness of the porous protective layer 5 is 200 μm, cracks were observed in all samples, and at 300 μm, there was only one sample with no crack.

Incidentally, there is a possibility that the sensor element 1 and the element cover 2 may be in contact in the sample of the porous protective layer 5 having the thickness of 1300 μm, thus it was judged impossible to assemble.

Accordingly, an effect of preventing the gas sensor S from cracking due to the water is high when the thickness of the porous protective layer 5 lies in the range of 500 μm to 1200 μm.

The gas sensor S is not limited to the configuration of the above embodiment; however, various modifications are possible within the scope of the present disclosure.

For example, the structure of the detecting section 3 of the sensor element 1, the shape of the element cover 2 for protecting the sensor element 1, the size and number of the gas flow holes, the arrangement and the like can be configured arbitrarily.

Although the gas sensor S is used as the air-fuel ratio sensor or the oxygen sensor installed in the exhaust pipe of the automobile engine as an example in the above embodiment, other gases in the exhaust gas may be a detecting target.

Furthermore, the present disclosure can be applied to various uses other than the exhaust gas sensor, and the measured gas is not intended to assume the exhaust gas from the automobile engine, but the measured gas may be a combustion exhaust gas or the like that contains particulate matter with oxygen and other gases to be detected.

What is claimed is:

1. A gas sensor comprising:
    a cylindrical housing;
    a sensor element which is inserted and held in the cylindrical housing, the sensor element having a detection section at a distal end portion thereof for detecting a specific gas concentration in a measured gas; and
    an element cover disposed on a distal end side of the cylindrical housing, which surrounds a periphery of the sensor element protruding from the cylindrical housing; wherein,
    the sensor element includes:
    a solid electrolyte body having oxygen ion conductivity, the solid electrolyte body is formed in a cylindrical shape;

electrodes formed on a surface of the solid electrolyte body, the electrodes constituting the detecting section;

a heater accommodated in a cylinder of the solid electrolyte body; and a porous protective layer formed on an outside of the detecting section; wherein, the element cover has a double-cover structure formed of an inner cover and an outer cover, a space is formed between distal end surfaces of the inner cover and the outer cover;

the inner cover is provided with gas flow holes on a side surface of the inner cover, and a gas passage is formed between an outer surface of the sensor element and an inner surface of the inner cover;

a distance between the inner cover and the side surface of the sensor element in a direction perpendicular to an axis of the sensor element is in a range of 0.2 mm to 0.8 mm in the entire region of the gas passage leading from the gas flow holes to the detecting section; and the distance of a space between the inner cover and the outer cover on the distal end side is larger than the distance of a space between the inner cover and the outer cover on the lateral side.

2. The gas sensor according to claim 1, wherein, the distance in the direction perpendicular to the axis is in a range of 0.2 mm to 0.6 mm.

3. The gas sensor according to claim 1, wherein, the thickness of the porous protective layer is in a range of 500 μm to 1200 μm.

4. The gas sensor according to claim 1, wherein, the outer cover is disposed coaxially on an outside of the inner cover, and is provided with gas flow holes on a side surface of the outer cover;

a gas passage is formed between the outer cover and an outer surface of the inner cover; and the heater heats the inside surface of the inner cover to a temperature of 500° C. or more via the porous protective layer.

5. The gas sensor according to claim 1, wherein, the measured gas is an exhaust gas discharged from an internal combustion engine, and contains particulate matter.

6. The gas sensor according to claim 5, wherein, the gas sensor is mounted such that the element cover is protruded and positioned in the exhaust pipe downstream side of a catalyst disposed in the exhaust pipe of the internal combustion engine, and detects an air-fuel ratio of the exhaust gas that has passed through the catalyst.

* * * * *